United States Patent [19]
Miyata

[11] Patent Number: 6,052,347
[45] Date of Patent: Apr. 18, 2000

[54] METHOD AND APPARATUS FOR DETECTING OPTIMUM RECORDING POWER FOR AN OPTICAL DISK

[75] Inventor: Hiroyuki Miyata, Sagamihara, Japan

[73] Assignee: Ricoh Company, Ltd., Tokyo, Japan

[21] Appl. No.: 08/805,232

[22] Filed: Feb. 24, 1997

[30] Foreign Application Priority Data

Feb. 23, 1996 [JP] Japan ................................. 8-036098

[51] Int. Cl.⁷ ......................................................... G11B 7/00
[52] U.S. Cl. ............................................................. 369/54
[58] Field of Search ................................ 369/54, 116, 50, 369/58, 121

[56] References Cited

U.S. PATENT DOCUMENTS

| | | | |
|---|---|---|---|
| 4,631,713 | 12/1986 | Romeas et al. | 369/54 |
| 5,185,733 | 2/1993 | Finkelstein et al. | 369/54 |
| 5,592,452 | 1/1997 | Yoshimoto et al. | 369/54 |
| 5,629,913 | 5/1997 | Kaku et al. | 369/54 |
| 5,703,841 | 12/1997 | Hiroki | 369/116 |

FOREIGN PATENT DOCUMENTS

7-235057  9/1995  Japan .
7-287847  10/1995  Japan .

*Primary Examiner*—Thang V. Tran
*Attorney, Agent, or Firm*—Oblon, Spivak, McClelland, Maier & Neustadt, P.C.

[57] ABSTRACT

An optical disk is provided with multiple data recording areas and optimum power control (OPC) areas encompassing each data recording area. The disk is formatted as a modified constant linear velocity (MCLV or ZCLV) disk. Test recordings are made in each OPC area and an optimum recording power distribution is determined based on the test recordings, according to radius and optimum recording power, at each OPC area. Optimum recording power for any track of a data recording area on the optical disk is determined by applying a radius of that track to the optimum recording power distribution which is linear in nature. Alternatively, the test recordings can be made in either a single or a reduced number of OPC areas based upon an innermost OPC area that, because of the ZCLV format, has recording areas maintained at linear velocities equivalent to all areas within each subsequent data recording area. Therefore, test recordings can be made in a single or reduced number of OPC areas. An apparatus and method is provided that identifies OPC areas, makes test recordings and determines a recording power distribution (optimum recording power line) for each data recording area of the disk.

21 Claims, 9 Drawing Sheets

METHOD AND APPARATUS FOR DETECTING OPTIMUM RECORDING POWER FOR AN OPTICAL DISK

BACKGROUND OF THE INVENTION

1. Field of the Invention

This invention relates to an optical disk and an optical disk recording apparatus and method. The invention is more particularly related to the determination of optimum recording power for an optical disk. The invention is further related to the determination of an optimum power for making recordings by performing test recordings in test areas on an optical disk and determining optimum recording power throughout the recording area based on the test recordings. The invention is still further related to determining optimum recording power throughout a modified constant linear velocity (ZCLV) formatted optical disk by making multiple test recordings in an area of the ZCLV formatted optical disk corresponding to the recording characteristics of the entire disk and determining optimum recording power based on the test recordings.

2. Discussion of the Background

Throughout the history of the development of storage devices, design engineers have strived to increase capacity and speed of storage devices. Current industry efforts are directed towards storage on optical disks. Increasing pressure for development of fast, high capacity optical disks is being levied by, among others, the motion picture industry, the music recording industry, and a wide range of computer application developers.

In the development of an optical storage device, design engineers are faced with the challenge whereby the storage device must determine and apply an amount of power in order for the device to make recordings. If not enough power is applied, recordings will either be ineffective or flawed. Applying too much power can create similar problems and is less energy efficient.

A current industry standard to determine an optimum recording power level for an optical disk is described in the standard CD-WO (Compact Disk Write Once) in the Orange Book Part 2. As described therein, with CD-WO, also known as Optimum Power Control (OPC), an industry adopted power optimizing method for laser recording on an optical disk is provided. OPC is a technique for determining an optimum recording power for an optical disk media and optical driving apparatus combination before data recording is executed.

The procedure of OPC is to first read a value of a recommended recording power (P0) which is recorded on the optical disk. Next, a test recording is executed wherein data is recorded utilizing several levels of recording power based on the recommended recording power (P0). These test recordings are performed in a power calibration area (PCA) of the optical disk. Based on the reproduction of the test data thus recorded, an optimum recording power for the optical disk is determined. The power calibration area (PCA) is also commonly referred to as an optimum power control (OPC) area.

CD-WO is a constant linear velocity (CLV) disk. With a CLV disk, the linear velocity at which recording and reading operations are performed is constant regardless of which track on the disk is being recorded or read. Because the CD-WO disk is maintained at a constant linear velocity, recording characteristics are constant throughout the entire disk. Thus, a PCA is maintained in one area positioned in an inner area of a data recording area of the CD-WO disk.

Japanese Laid-Open Patent Nos. 1995-235,057 and 1995-287,847 each detail methods of OPC with increased accuracy over the Orange Book Part 2 standard. In these methods, the PCA of a CD-WO disk is divided into small plural areas in which the OPC procedure is executed more times, thus providing increased accuracy. In Orange Book Part 2, PCA utilizes a unit of 15 frames for a test recording, while within the OPC methods in the above-mentioned Japanese Laid-Open Patents, PCA utilizes a unit of 5 frames thereby allowing room for additional test recordings. The method thus described results in more accurate OPC and recording frequency as compared with the standardized method in the OPC Orange Book Part 2. The above method is applied to a constant linear velocity disk (CLV) and therefore, as described above, the PCA is in only in one area of the disk.

Thus far we have discussed optical disks applying a constant linear velocity (CLV) format for rotation of the optical disk. Another rotational format, known as modified constant linear velocity (MCLV or ZCLV) is also popular. A ZCLV formatted disk is divided into plural zones and is rotated at a constant angular velocity (CAV) within each zone. The angular velocity of the ZCLV disk changes as the disk is recorded or read in different zones.

FIG. 1A is a schematic view showing a disk format applied to a modified constant linear velocity optical disk, ZCLV disk 1. In FIG. 1A, the ZCLV disk 1 has two zones, an inner zone 3 and an outer zone 5. FIG. 1A also illustrates a sector 7 of the ZCLV disk 1 which is one of many sectors composing each zone on the ZCLV disk 1. FIG. 1B illustrates the inner zone 3, FIG. 1C illustrates the outer zone 5, and FIG. 1D highlights sector 7 showing multiple tracks 9 found in each zone throughout the ZCLV disk 1. The ZCLV disk 1 may also be formatted in multiple zones (zones 1–4, for example) as illustrated in FIG. 1E.

In ZCLV, a recording area is divided into plural zones (inner zone 3 and outer zone 5 of FIG. 1A, for example) and the disk rotates at a constant angular velocity (CAV) within each zone. When a recording area of a disk changes from one zone to another (from inner zone 3 to outer zone 5, for example), the angular velocity of the disk changes according to the new recording zone. Also, a linear velocity of an innermost track in each zone is at a reference linear velocity Vr. Therefore, the linear velocity of tracks within each zone of a ZCLV formatted disk start at a reference linear velocity Vr and increase throughout the zone.

The various velocities and features of a ZCLV formatted disk are shown in FIGS. 2A–2D. FIG. 2A is a graph showing the angular velocity of ZCLV disk 1 with reference to four zones (zone 1, zone 2, zone 3, and zone 4). The angular velocity of the ZCLV disk 1 is stepped incrementally for each zone, the inner zones (zone 1 and zone 2) being at a higher angular velocity than the outer zones (zone 3 and zone 4). For further reference, a dashed line represents the angular velocity of a CLV formatted disk showing a gradual decrease in angular velocity with increasing radius.

FIG. 2B is a graph representing changing linear velocity of the ZCLV disk 1. As seen in FIG. 2B, an innermost track of each zone is at a reference linear velocity Vr, and linear velocity increases towards each outer track in each zone.

FIG. 2C represents sector lengths within each zone of ZCLV disk 1. The sector lengths in FIG. 2C are equivalent at an innermost track of each zone and are increasing with increasing radius in each zone. FIG. 2D illustrates a recording/reproducing frequency utilized in recordings on ZCLV disk 1. The recording/reproducing frequency is shown at a constant level throughout each zone.

In more detail, the relation between a track positioned at a particular radius of ZCLV disk 1 and angular velocity is shown in FIG. 3. FIG. 3 shows zone 1 between radius R1 and R2, zone 2 between radius R2 and R3, and zone 3 between radius R3 and R4. The angular velocity for each zone is shown on a vertical axis. As seen in FIG. 3, the angular velocity remains constant within each zone, but changes between zones. Because the angular velocity within each zone remains constant, the linear velocity within each zone changes according to radius.

FIG. 4 illustrates linear velocity according to radius for three zones (zone 1, zone 2 and zone 3) of the ZCLV disk 1. The innermost radius (or track) of each zone is at a constant reference linear velocity Vr. The linear velocity increases throughout the zone to a final velocity representing a ratio of the radii of outer to inner tracks of each respective zone applied against the reference linear velocity Vr ((R2/R1)Vr, for zone 1, for example).

When ZCLV format is applied to a disk of which a recording area is contained within radii between 20 mm and 60 mm, which is almost the same as CD (compact disk) and DVD (digital video disk), the disk is divided into 10–20 zones. Since the linear velocity at any particular track within each respective zone is in proportion to the innermost radius of the respective zone versus the radius of the particular track within the respective zone, and each subsequent zone begins at an increased radius reducing the proportion thus described, a variance in linear velocity within a zone is approximately 10% to 20% for the case of an inner zone and approximately 3% to 7% in the case of an outer zone. This variance in linear velocity within a zone is represented by the slopes of lines representing linear velocity in each zone in FIG. 4 (zone 1 corresponding to an inner zone, and zone 3 corresponding to an outer zone). The differences in change of linear velocity between zones (between 3% and 20%) are accounted for because of the varying ratios between the innermost radius and all other radii within a same zone.

The recording process is complicated by the changing linear velocities within zones of ZCLV disk 1. In order to make high quality recordings, the recording power is required to be in proportion to the linear velocity. Therefore, the recording power must be increased as linear velocity increases within a zone, and high quality recording cannot be achieved via a single recording power when utilizing a ZCLV formatted disk.

The present inventor has realized that in order to achieve high quality recording on a ZCLV formatted disk, the recording power must be controlled in proportion to a radius within each zone as shown in FIG. 5. FIG. 5 is a graph having a vertical axis corresponding to estimated recording power and a horizontal axis corresponding to radii for each of three zones on ZCLV disk 1. The recording power in the innermost track within each zone is P0. The recording power at an outermost track within each zone is required to be set in proportion to the outer and inner radii times P0 (such as (R2/R1)P0 for zone 1, for example). P0 is an amount of power recommended by the disk manufacture but may not correspond to an optimum recording power because of differences in individual disks or machine characteristics.

When Optimum Power Control (OPC) is intended to be achieved, it is necessary to optimize recording power in accordance with a combination of a disk media and a disk driving apparatus because of variances in material and manufacture of the media and driving apparatus. However, in a ZCLV formatted disk, since the linear velocity is different within each zone and therefore the recording characteristic within each zone are also different, OPC cannot be achieved by a single optimum recording power which, in the case of CLV formatted disks, is obtained in only one test recording area as explained above.

The present inventor has realized that a laser recording power optimizing method is needed that can be applied to ZCLV formatted optical disks such that OPC can be maintained throughout each zone of a ZCLV formatted disk. The method should also account for recording characteristics of the disk media and disk driving apparatus, and therefore allow for high quality recordings.

SUMMARY OF THE INVENTION

Accordingly, it is an object of this invention to provide a ZCLV formatted optical disk having at least one data recording area with at least two test recording areas for determining recording power for the data recording area.

It is another object of the present invention to provide an apparatus for determining a recording power distribution in at least one data recording area of an optical disk based upon test recordings made in at least one test recording area.

It is yet another object of the present invention to provide a method for determining optimum recording power levels across multiple data recording areas in a ZCLV formatted optical disk by recording test data in at least one test data area and determining the optimum recording power levels based on the test data recorded.

These and other objects are accomplished by an optical disk having a ZCLV format and having a data recording area in which data is recorded. The data recording area has at least two corresponding test recording areas in which test recordings are made to determine an optimum recording power. Test recordings are made at various power levels. Based on the quality of the test recordings, an optimum recording power at a respective radius for each test recording area is determined. Recording power for a specific track of the data recording area is then determined by reference to a point on a line represented by a respective radius corresponding to each test recording and a respective optimum recording power determined from each test recording.

The test recordings may alternatively be made in a single or reduced number of test recording areas by providing a test recording area at an innermost area of the optical disk. The test recording area thus provided maintains linear velocities equivalent to appropriate test areas in subsequent data recording areas. Test recordings are then made at the innermost test recording area in lieu of test recording areas which would otherwise be provided subsequently.

An apparatus for determining recording power distributions in each data recording area is provided. The apparatus includes a device for detecting test areas on the disk, a device for controlling test recording power, a device for determining optimum recording power in each test, and a device that determines the recording power distribution for each data recording area based upon optimum recording power determined in each test.

Finally, a method is provided for determining the optimum recording power across all data recording areas of the disk. The method includes the steps of detecting test recording areas, executing test recordings in the test recording areas detected, determining an optimum recording power for each test area, and determining the optimum recording power across all data recording areas of the disk based on the optimum recording power determined in each test area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 5:
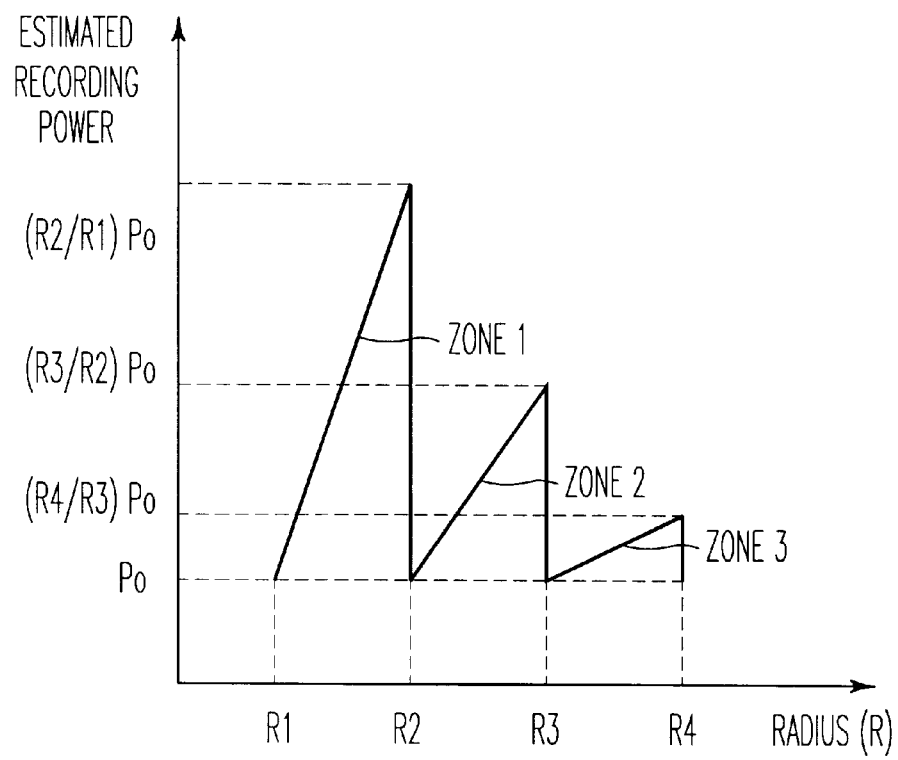
FIG. 5 is a graph illustrating an estimated recording power within zones of a ZCLV formatted disk based upon a radius within the zone and a recommended recording power (Po)

Referring now to the drawings, wherein like reference numerals designate identical or corresponding parts throughout the several views, and more particularly to FIG. 5 thereof, there is illustrated an estimated recording power which varies within respective zones of a ZCLV disk 1. The estimated recording power is a straight line between two radii encompassing each respective zone. The estimated recording power distribution for zone 1 is shown as a straight line between radii R1 and R2 (encompassing zone 1), starting at power level Po and ending at a power level in proportion to the radii and corresponding to (R2/R1)Po. Similarly, an estimated recording power distribution is also shown for zone 2 and zone 3 (encompassed by radii R2, R3, and R3, R4 respectively).

Figure 6:
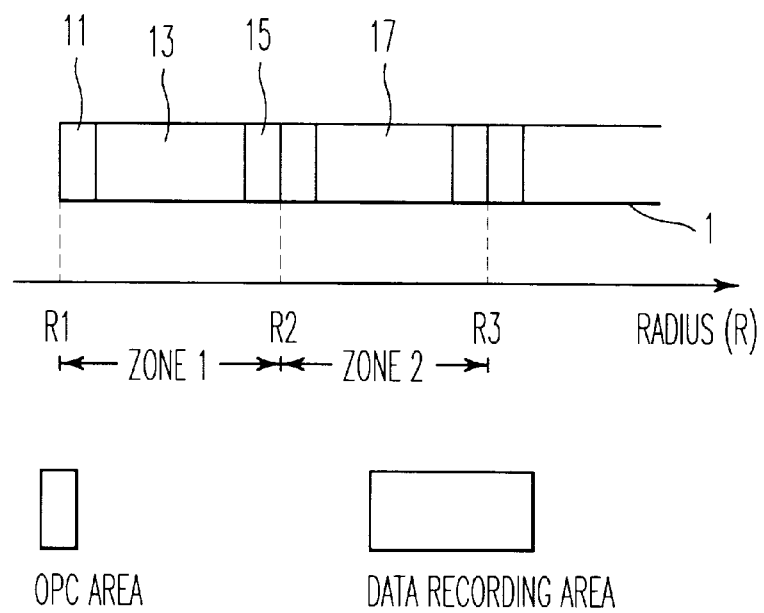
FIG. 6 illustrates two zones a ZCLV formatted disk having two OPC areas and a data recording area in each zone.

FIG. 6 shows the spatial relationship between recording areas and optimum power calibration (OPC) areas on ZCLV disk 1. In FIG. 6, zone 1 between radii R1 and R2 is shown to have two OPC areas 11 and 15, and one data recording area 13. OPC areas 11 and 15 are formed at inner and outer track positions of zone 1 respectively. Similarly located OPC areas are included in the other zones (zone 2, for example) on the ZCLV disk 1.

In the case of zone 1, the estimated recording power distribution is a straight line which goes through coordinates (R1, Po) and (R2, (R2/R1)Po) as shown in FIG. 5 and described above. A corrected recording power distribution is determined for zone 1 by performing test recordations in the two OPC areas 11 and 15. Test recordings in OPC areas 11 and 15 are executed based on the recommended recording power Po. As a result of the test recordings thus executed, power levels Pm1 and Pm2 are determined to be an optimum recording power for OPC areas 11 and 15 respectively, and a straight line representing a corrected recording power distribution can then be determined.

Figure 7:
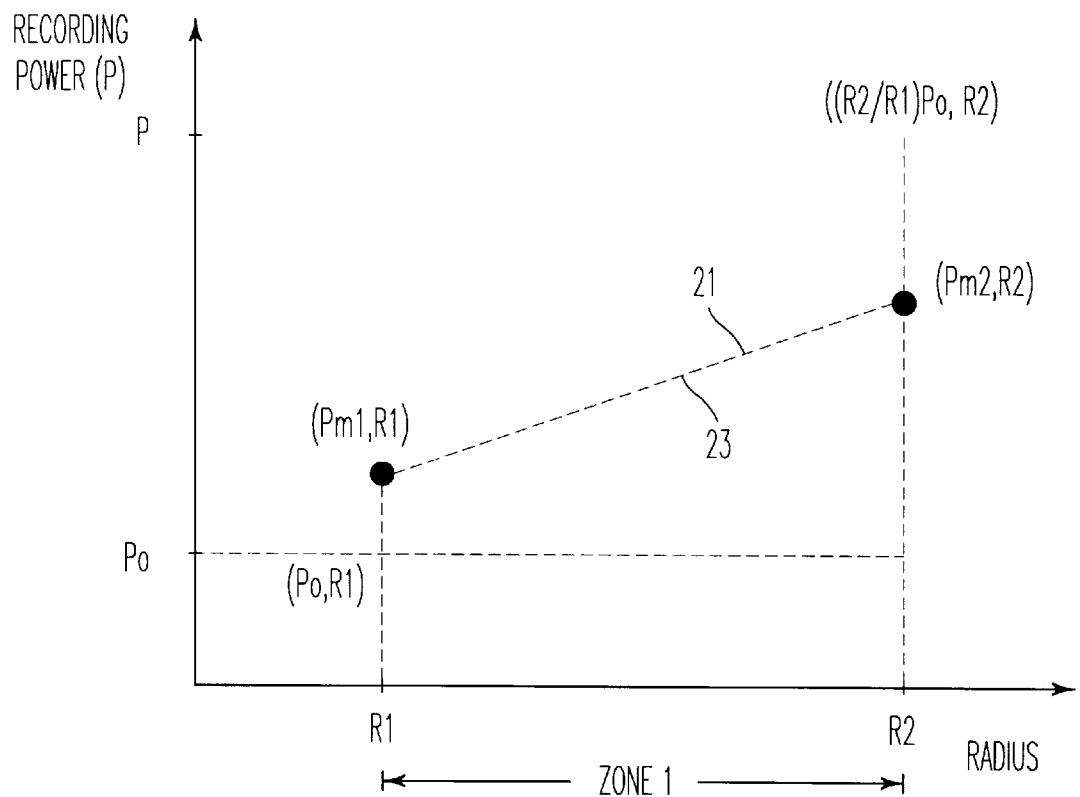
FIG. 7 is a graph illustrating an estimated recording power distribution and a corrected recording power distribution in a zone of a ZCLV formatted disk.

FIG. 7 illustrates a broken line 23 between points (Pm1, R1) and (Pm2, R2) which represents corrected recording power based on power levels Pm1 and Pm2 as determined by test recordings. Also shown in FIG. 7 is an estimated recording power distribution 21 based on recommended recording power Po starting at point (Po, R1) and ending at point ((R2/R1) Po, R2). The corrected recording power distribution 23 can be applied directly to determine an optimum recording power at each point in the data recording area 13 of zone 1.

Alternatively, OPC areas 11 and 15 could be formed at positions other than the innermost and the outermost track positions of zone 1. A corrected recording power distribution would then be determined from two OPC areas at any position. Optimum recording power for data recording areas not between the OPC areas would then be determined based upon extension of a corrected recording power distribution determined similarly as above.

In addition, test recordings may be performed in more than two OPC areas. When three or more OPC areas are utilized, a regression line is sought from all coordinates of all radii and all optimum recording powers determined at each OPC area. The resulting line becomes the recording power distribution.

In the above method, optimum power is determined for a zone on ZCLV disk 1. The optimum power of the entire ZCLV disk 1 can be determined by applying the above method to each zone in the disk. To utilize the above on a ZCLV formatted optical disk having n zones requires at least 2n OPC areas to determine a corrected recording power distribution.

Figure 8:
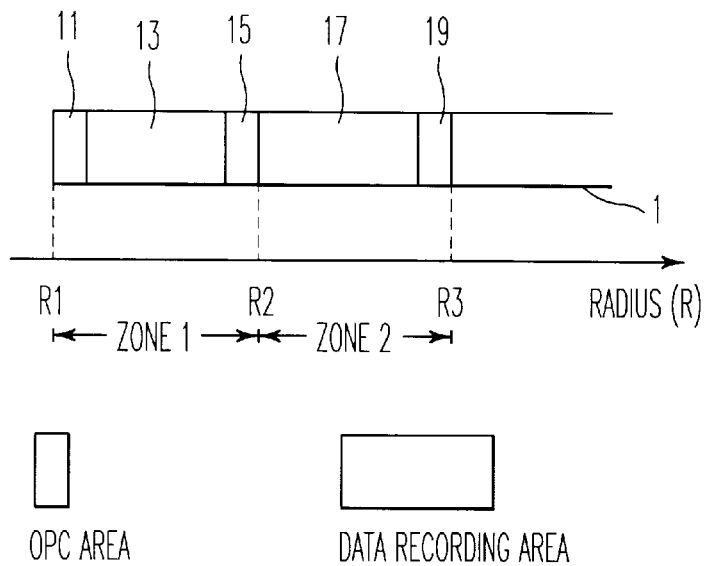
FIG. 8 illustrates a ZCLV formatted disk having two OPC areas and a data recording area in a first zone and one OPC area and a data recording area in each subsequent zone.

In a second embodiment, the number of OPC areas for the performance of test recordings is decreased. As shown in FIG. 8, OPC areas 11 and 15 are in zone 1 between radii R1 and R2 of ZCLV disk 1, and the corrected recording power distribution 21 for zone 1 is calculated as described in the previous embodiment. However, the estimated recording power distribution for zone 2 is determined with only one additional OPC area 19.

The corrected recording power distribution for zone 2 is determined utilizing two OPC areas, OPC area 11 in zone 1, and OPC area 19 in zone 2. The optimum recording power has already been calculated for OPC area 11 in zone 1, and therefore a test recording is executed in OPC area 19 in zone 2 to determine a second optimum recording power. A corrected recording power distribution for the data recording area 19 of zone 2 can be determined via the same method as performed for zone 1 by utilizing test recordings performed in OPC areas 11 and 19.

Figure 1A:
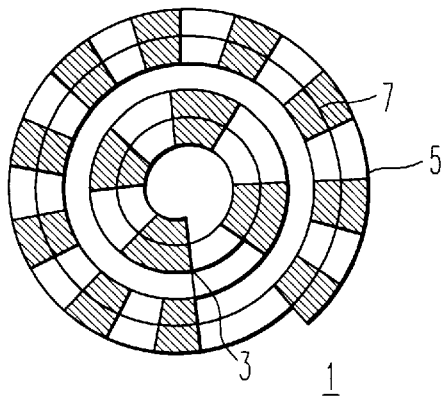
FIG. 1A is a schematic drawing of a ZCLV formatted disk having an inner zone and an outer zone.
Figure 1B:
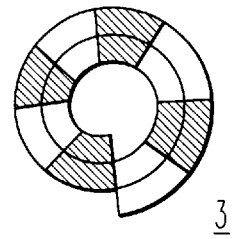
FIG. 1B is a schematic drawing of the inner zone of the ZCLV formatted disk of FIG. 1A.
Figure 1C:
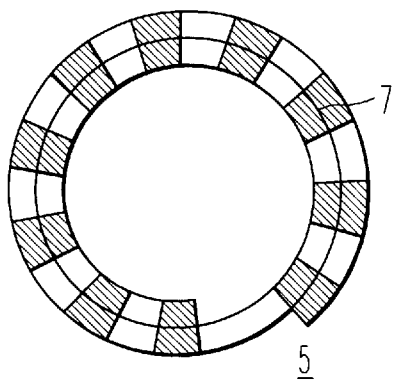
FIG. 1C is a schematic drawing of the outer zone of the ZCLV formatted disk of FIG. 1A.
Figure 1D:
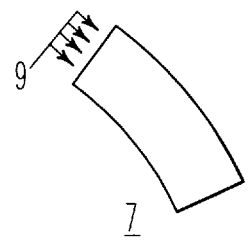
FIG. 1D illustrates multiple tracks of a sector of the ZCLV formatted disk of FIG. 1A.
Figure 1E:
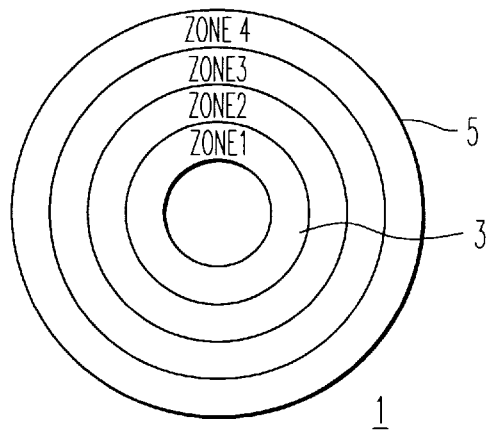
FIG. 1E illustrates the ZCLV formatted disk of FIG. 1A with four zones.
Figure 2A:
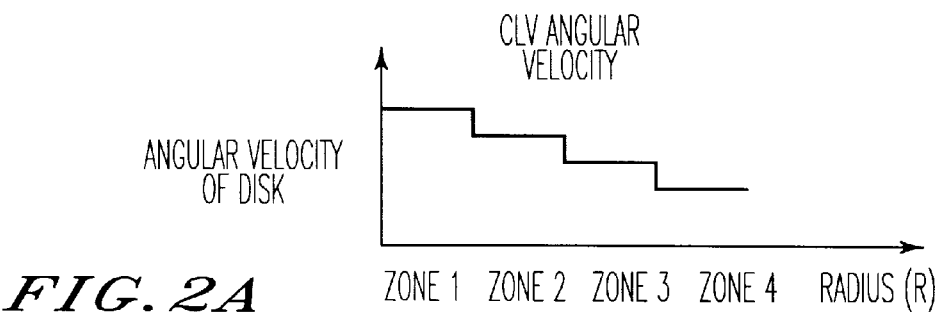
FIG. 2A is a graph illustrating angular velocity of ZCLV and CLV formatted disks with respect to zones on the disk.
Figure 2B:
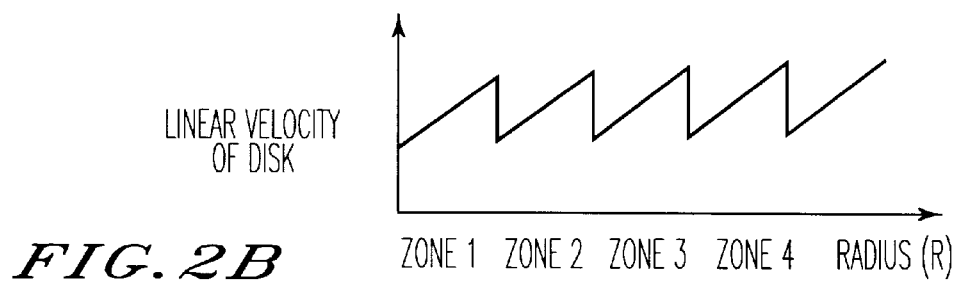
FIG. 2B is a graph illustrating linear velocity of a ZCLV formatted disk with reference to zones on the disk.
Figure 2C:
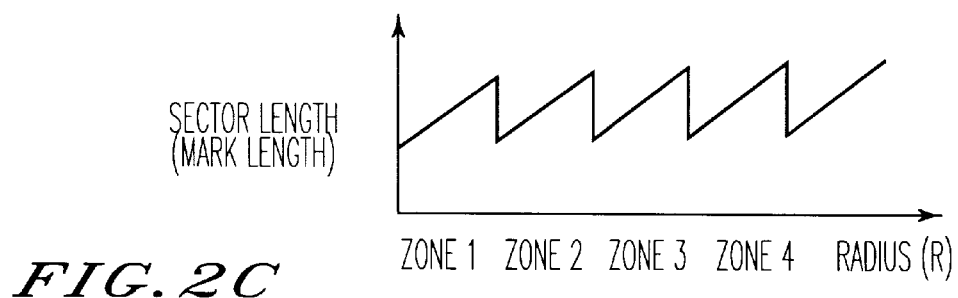
FIG. 2C is a graph illustrating sector length or mark length of a ZCLV formatted disk with reference to zones on the disk.
Figure 2D:
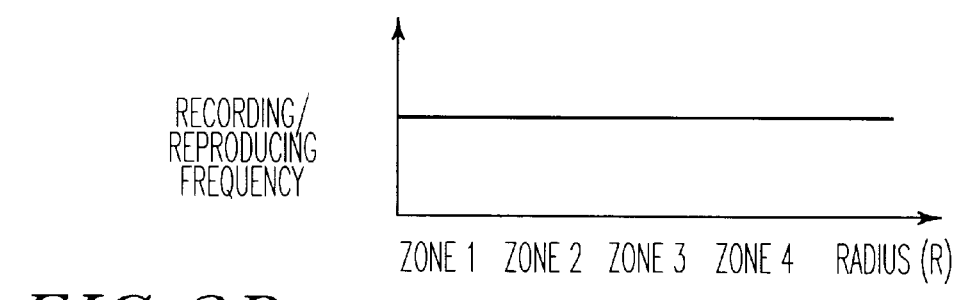
FIG. 2D is a graph illustrating a recording/reproducing frequency utilized to make recordings on a ZCLV formatted disk with reference to zones on the disk.
Figure 3:
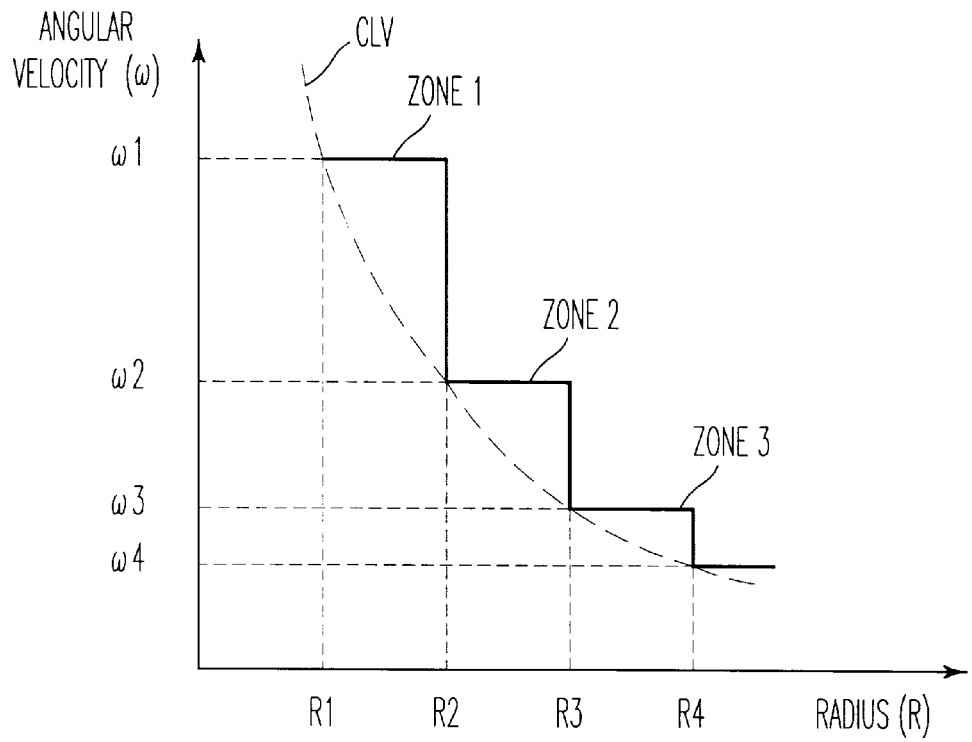
FIG. 3 is a graph illustrating angular velocity of a ZCLV formatted disk with reference to zones on the disk and radii encompassing each zone.
Figure 4:
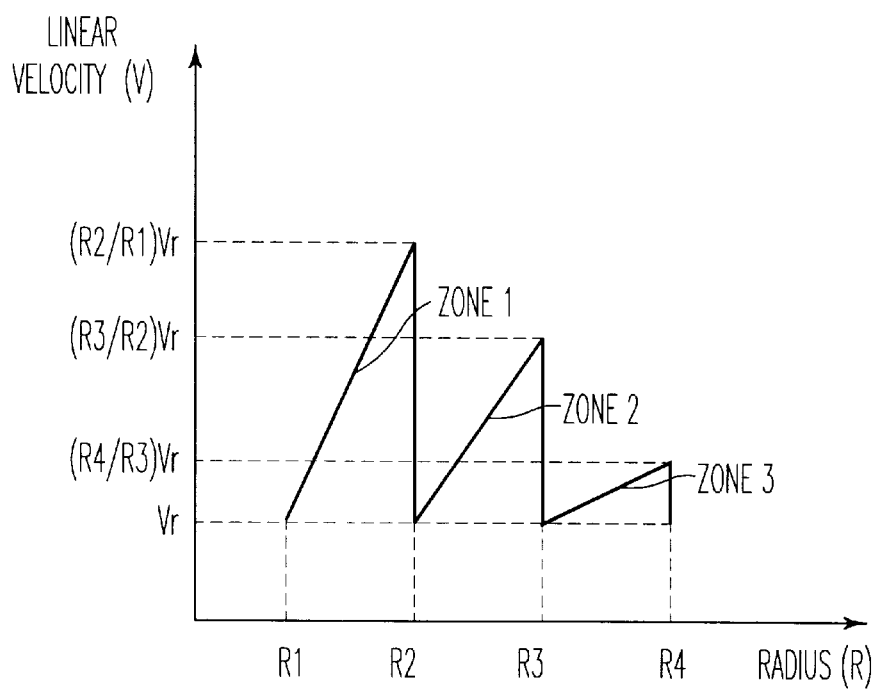
FIG. 4 is a graph illustrating linear velocity within zones of a ZCLV formatted disk with reference to a radius at each point within a zone.

Optimum recording power determined via test recordings in OPC area 11 of zone 1 can be substituted for an optimum recording power determination at an innermost track of subsequent zones. This is because the ZCLV disk 1 is maintained at a reference linear velocity Vr at an innermost track of each zone (see FIG. 2D), and test recordings made at an innermost track of one zone will be similar to test recordings made at an innermost track of any other zone due to the equivalent linear velocity.

In this embodiment, the optimum recording power is determined on a ZCLV formatted disk having n zones and data recording areas and at least (n+1) OPC areas. Therefore, the number of OPC areas for test recording can be decreased as compared to the previous embodiment and the optimum recording power is determined during less time because less test recordings and recording power calculations are performed.

Figure 9:
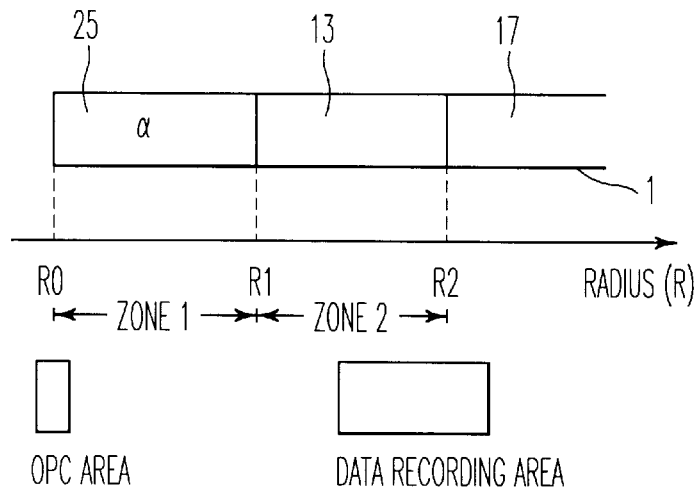
FIG. 9 illustrates a ZCLV formatted disk having an OPC area as a first zone and subsequent zones comprised of data recording areas.

In a third embodiment, illustrated in FIG. 9, the ZCLV disk 1 is provided with an α zone 25, reffered to as α because it is a first zone on the disk. The α zone 25 is an OPC area between radiuses R0 and R1. The α zone 25 has the same reference linear velocity Vr at an innermost track as with an innermost track in each zone on the ZCLV disk 1. In addition, the width of the α zone 25 is at least equal to the width of any single subsequent data recording area (data recording area 13 or 17, for example). Since the width of the α zone 25 is at least equivalent to the subsequent data recording areas, all linear velocities within the subsequent data recording areas are also contained in the α zone 25. If desired, it is not necessary to perform power testing in the entire α zone 25 but only areas having a linear velocity of interest need to be analyzed.

Figure 10:
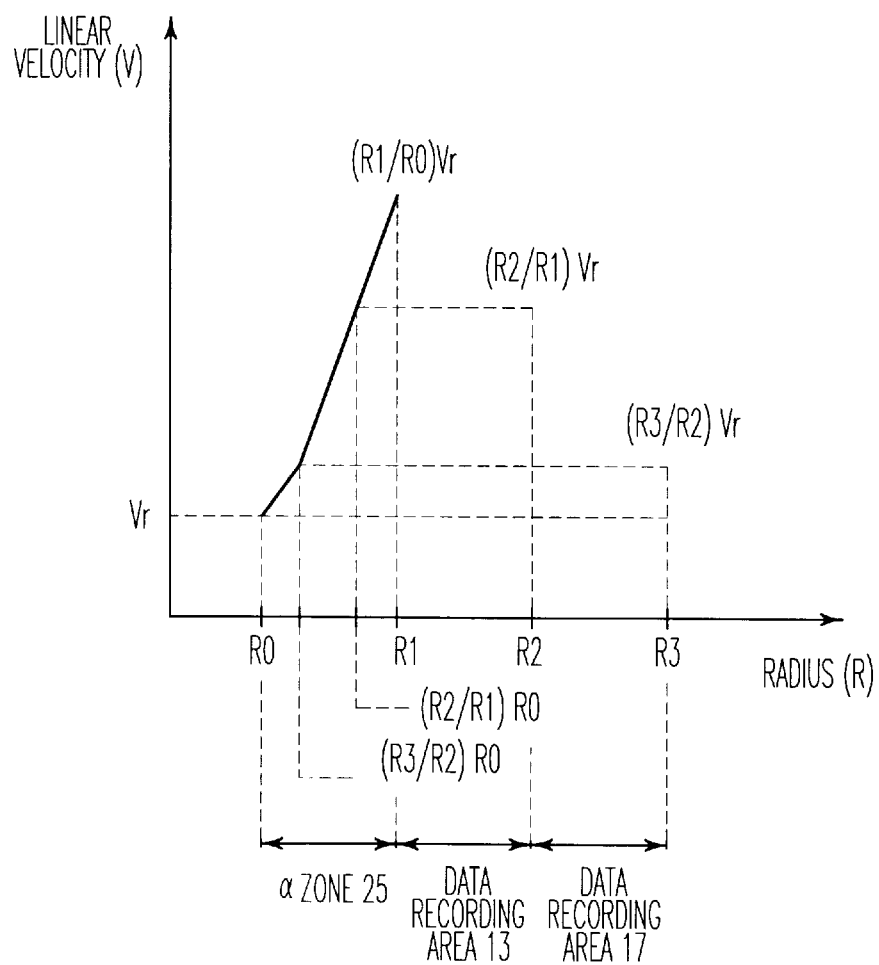
FIG. 10 is a graph illustrating a relationship between the linear velocity of an α zone and subsequent zones of a ZCLV formatted disk according to the present invention.

FIG. 10 illustrates linear velocity versus radius of ZCLV disk 1. The reference linear velocity Vr is shown at the innermost track of each zone on the ZCLV disk 1. The linear velocities for the α zone 25 are shown as a straight line between points (Vr, R0) and ((R1/R0)Vr, R1). Since the linear velocities at an innermost track of each zone is at reference velocity Vr, all linear velocities subsequent to the innermost track within a zone correspond to Vr proportionally by radius.

As shown in FIG. 10, the linear velocities for data recording areas 13 and 17 are in proportion to radius on the linear velocity line for the α zone 25. The linear velocities of a data recording area can be determined by applying a ratio of outer to inner radii of the data recording area and an inner radius of the α zone 25 to the linear velocity line for the α zone 25.

For example, radii R1 and R2 encompass data recording area 13. By applying the ratio (R2/R1)R0 to the linear velocity line for the α zone 25, as shown in FIG. 10, a maximum linear velocity of data recording area 13 is determined. Since each data recording zone begins at a reference linear velocity Vr, linear velocities can be determined throughout each data recording area on ZCLV disk 1.

Since the linear velocities of all subsequent data recording areas are utilized within the α zone 25, the characteristics affecting optimum recording power (mainly linear velocity) are also contained in the α zone 25. Therefore test recordings can be performed in the α zone 25 to determine optimum recording power for all subsequent data recording areas. For example, test recordings to determine a corrected recording power distribution for data recording area 13 would be performed at radius R0 and radius (R2/R1)R0 in the α zone 25 (see FIG. 10).

Since the optimum recording power corresponding to each subsequent data recording area can be retrieved from the α zone 25, seek time of an optical head for executing test recordings can be decreased. Therefore, the determination of a corrected recording power distribution for each data recording area is determined in less time than when those recordings are made in OPC areas within a corresponding zone (as described in the first and second embodiments).

Thus far, the third embodiment is premised on the width of the α zone 25 being equal to the width of each subsequent data recording area. However, even if the width of each zone on the ZCLV disk 1 is not equivalent, as long as the linear velocity (R1/R0)Vr corresponding to the outer track of the α zone 25 is higher than a linear velocity of an outermost track of a widest data recording area, the α zone 25 will contain the linear velocities for each of the subsequent data recording areas. Therefore, OPC for all zones on ZCLV disk 1 can be determined by the above method.

Figure 11:
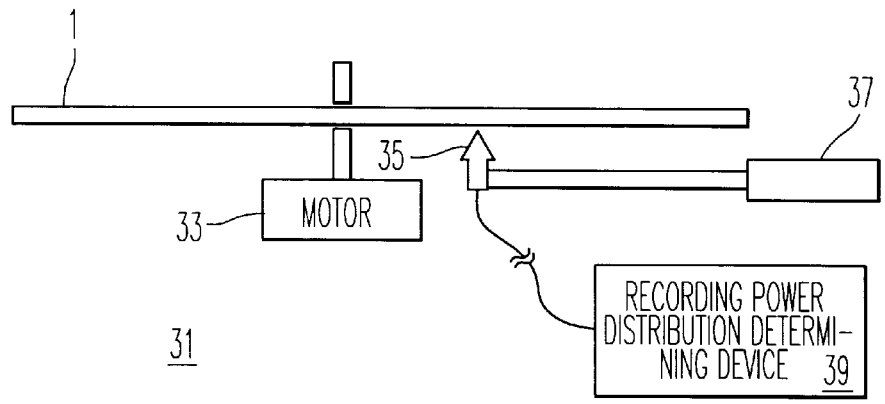
FIG. 11 illustrates the main components of an optical disk drive for a ZCLV formatted disk.

FIG. 11 illustrates the main components of an optical disk drive 31 for writing and reading of data to the ZCLV disk 1 according to the present invention. The optical disk drive 31 includes a motor 33 for spinning the ZCLV disk 1, optical head 35 for reading and writing to the ZCLV disk 1, and a head moving device 37 for positioning the optical head 35 to a track on the ZCLV disk 1. A recording power distribution device 39 is connected to the optical head 35 for making test recordings and determining recording power distributions.

Figure 12:
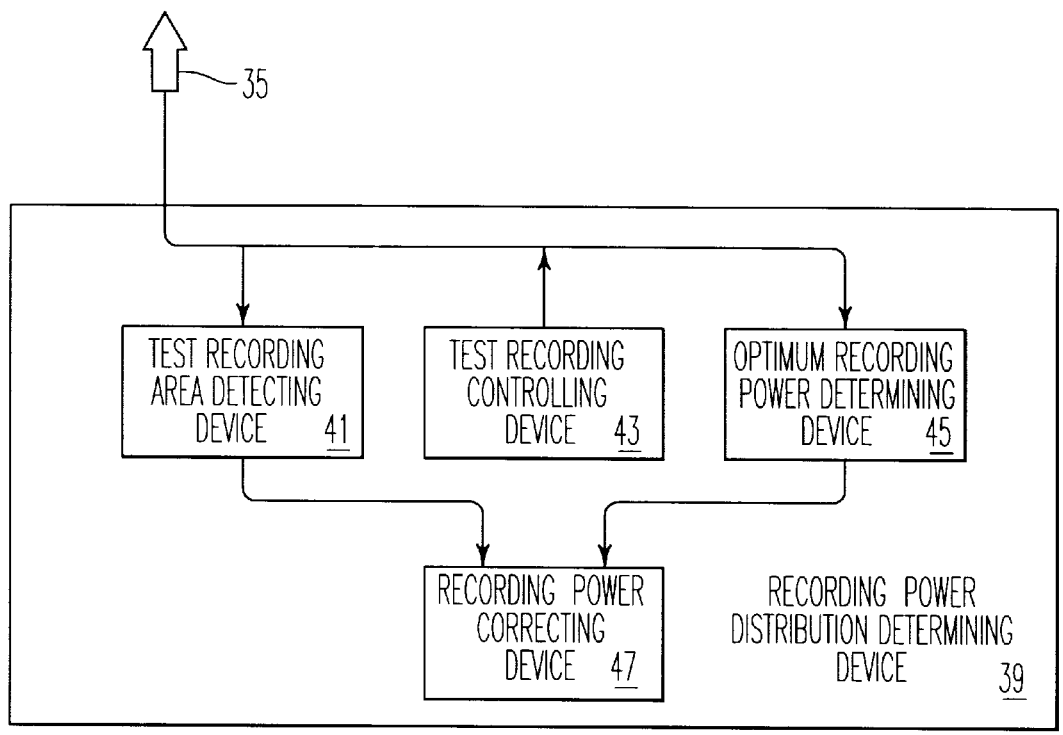
FIG. 12 illustrates a recording power distribution determining device according to the present invention.

FIG. 12 illustrates the major electronic and/or computer software related components included in recording power distribution device 39. These components include a test recording area detecting device 41, a test recording controlling device 43, an optimum recording power determining device 45, and a recording power correcting device 47. The test recording area detecting device 41 receives data from optical head 35 read from the ZCLV disk 1. The test recording area detecting device 41 utilizes the data thus read to determine whether or not a current track of the ZCLV disk 1 is within an OPC area (such as OPC area 11, 15, 19, or the α zone 25, for example).

Test recording controlling device 43 determines when a test recording is to be made and records test data via the optical head 35 to the ZCLV disk 1 and directs the optical head 35 to read test data thus recorded. The optimum recording power determining device 45 determines an optimum recording power based upon data recorded in an OPC area as described in the above embodiments. The recording power correcting device 47 determines corrected recording power distributions based upon test data recorded and read in OPC areas by the test recording controlling device 43.

Figure 13:
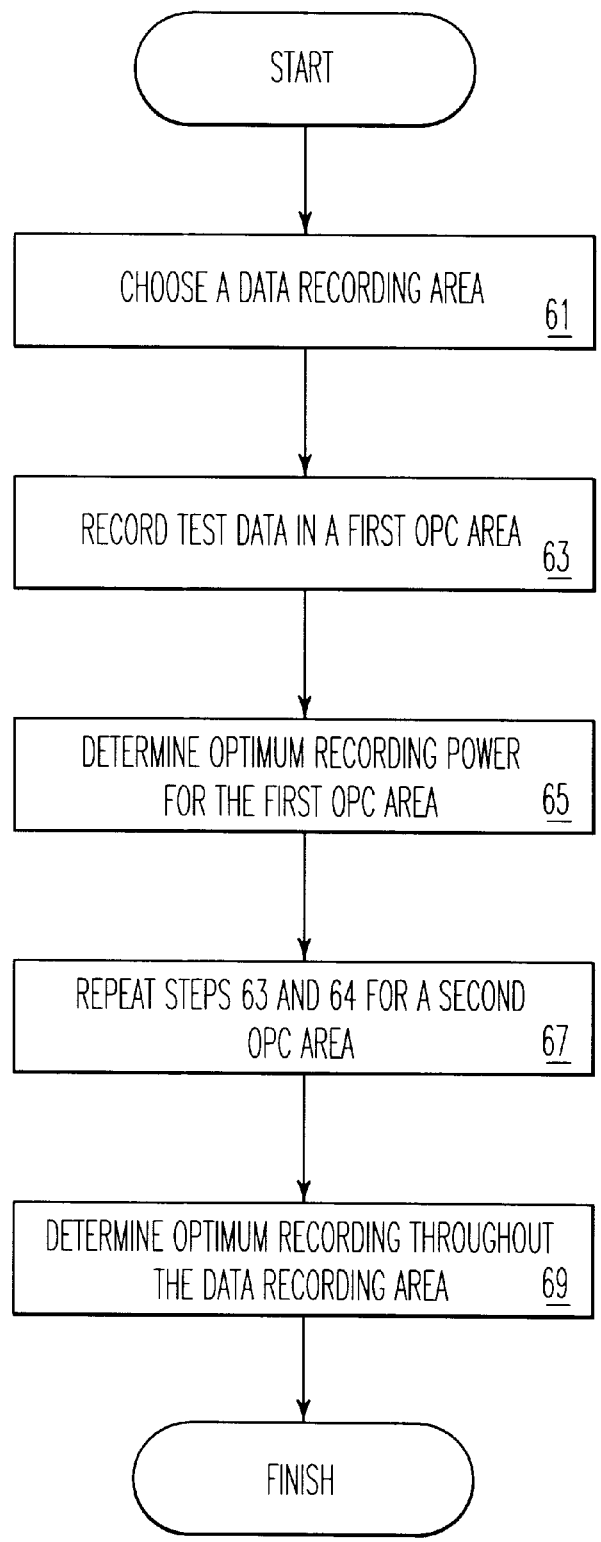
FIG. 13 is a flowchart illustrating the operation of an embodiment of the present invention.

The optical head 35 thus reads data, and records and reads test data to and from OPC areas in accordance with the above embodiments in order to determine recording power necessary to make high quality recordings on the ZCLV disk 1. The process to determine an optimum recording power for a specific track on the ZCLV disk 1 is illustrated in FIG. 13.

The process begins with step 61 to choose a data recording area. The test recording area detecting device 41 then detects a first OPC area corresponding to the chosen data recording area and the test recording controlling device 43 records test data to the first OPC area in step 63. At this point, the optimum recording power determining device 45 performs a step 65 to determine an optimum recording power for the first OPC area. Steps 63 and 65 are repeated for a second OPC area 67 in step 67. Finally, optimum power throughout the data recording area is determined in step 69 based on the optimum recording power determined for each OPC zone in step 65.

Figure 14:
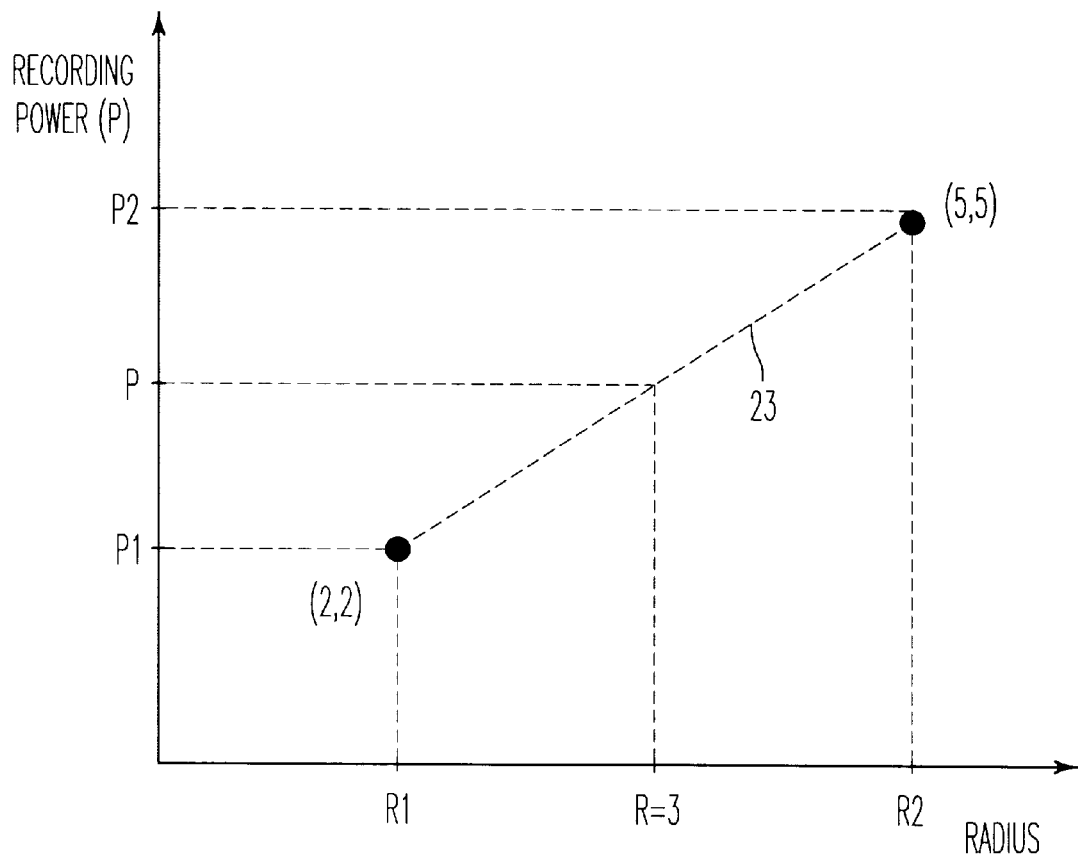
FIG. 14 is a graph illustrating a corrected recording power distribution.

The determination of optimum power throughout the data zone as recited in step 69 is now described with reference to FIG. 14. FIG. 14 illustrates two points on a ZCLV disk 1 at radius R1 and radius R2 wherein an optimum recording power P1 and P2, respectively, were determined by making test recordings. The test recordings were made in two OPC areas also corresponding respectively to radius R1 and radius R2. A line drawn between these two points identifies a corrected recording power distribution throughout a data zone encompassed between radius R1 and R2.

The equation for determining an optimum power P at a radius R is:

$$P = \frac{(P2 - P1)}{(R2 - R1)} \times (R - R1) + P1$$

Therefore, substituting example values 2, 2, 5, 5 for P1, R1, P2, R2, respectively, as shown in FIG. 14, and a value of 3 for a radius, a corrected recording power P can be determined. Utilizing the above equation, a corrected recording power distribution is determined throughout the entire ZCLV disk 1.

This invention may be conveniently implemented using a or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMS, magnetic or optical cards, or any type of media suitable for storing electronic instructions. Further, the invention includes the optical disks, CD-ROMS, DVDS, and other media which are used with the invention. For example, disks having the structures including the OPC zones illustrated in the drawings including a disk containing the α zone constitute part of the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of determining a recording power distribution in a modified constant linear velocity (ZCLV) formatted optical disk, comprising the steps of:

writing two optimum power control (OPC) areas with varying recording powers in a constant angular velocity zone of the disk;

determining an optimum recording power for each of the two OPC areas; and determining a recording power distribution proportional to both linear velocity and a ratio of the radii of said two optimum power control areas for the constant angular velocity zone of the disk by analyzing the optimum recording power which was determined for the two OPC areas.

2. A method according to claim 1, wherein said step of determining a recording power distribution comprises:

determining a linear relationship representing the recording power distribution using two points in the constant angular velocity zone, a first of the two points corresponding to a radius of a first of the two OPC areas and the optimum recording power of the first OPC area, and a second of the two points corresponding to a radius of a second of the two OPC areas and the optimum recording power of the second OPC area.

3. A method according to claim 1, further comprising the steps of:

writing data between the two OPC areas at a power corresponding to the recording power distribution.

4. A method according to claim 1, further comprising the step of:

writing two OPC areas with varying recording powers in a second constant angular velocity area of the disk;

determining an optimum recording power for each of the two OPC areas of the second constant angular velocity area of the disk; and determining a second recording power distribution for the second constant angular velocity zone of the disk by analyzing the optimum recording power which was determined for the two OPC areas of the second constant angular velocity area of the disk.

5. A method according to claim 1, further comprising the step of:

writing an OPC area with varying recording power in a second constant angular velocity area of the disk;

determining an optimum recording power for the OPC area of the second constant angular velocity area of the disk; and determining a second recording power distribution for the second constant angular velocity zone of the disk by analyzing the optimum recording power which was determined for the OPC area of the second constant angular velocity area of the disk and one of the other OPC areas.

6. A method according to claim 5, wherein:

said step of writing the OPC area in the second constant angular velocity area writes the OPC area in an area of the second constant angular velocity zone having a largest radius; and the step of determining a second recording power distribution comprises determining a second recording power distribution for the second constant angular velocity zone of the disk by analyzing the optimum recording power which was determined for the OPC area of the second constant angular velocity area of the disk and one of the other OPC areas which has a smaller radius.

7. A method for determining optimum recording power distribution in a modified constant linear velocity (ZCLV)

formatted optical disk having multiple data recording areas, comprising the steps of:

performing multiple test recordings in a plurality of areas having different radii of the optical disk which occur within a single zone of the optical disk which rotates at a constant angular velocity;

determining an optimum recording power for each of the plurality of areas; and determining a recording power distribution proportional to both linear velocity and a ratio of radii of said plurality of areas for each of the radii of the multiple data recording areas which rotate at different angular velocities by analyzing the optimum recording powers for each of the plurality of areas.

8. A method according to claim 7, wherein the step of performing multiple test recordings comprises:

performing multiple test recordings within the single zone which is used solely for determining the recording power distribution.

9. A method according to claim 7, wherein the step of performing multiple test recordings comprises:

performing multiple test recordings within the single zone without recording any user data in the single zone.

10. A system of determining a recording power distribution in a modified constant linear velocity (ZCLV) formatted optical disk, comprising:

means for writing two optimum power control (OPC) areas with varying recording powers in a constant angular velocity zone of the disk;

means for determining an optimum recording power for each of the two OPC areas; and means for determining a recording power distribution proportional to both linear velocity and a ratio of the radii of said two optimum power control areas for the constant angular velocity zone of the disk by analyzing the optimum recording power which was determined for the two OPC areas.

11. A system according to claim 10, wherein said means for determining a recording power distribution comprises:

means for determining a linear relationship representing the recording power distribution using two points in the constant angular velocity zone, a first of the two points corresponding to a radius of a first of the two OPC areas and the optimum recording power of the first OPC area, and a second of the two points corresponding to a radius of a second of the two OPC areas and the optimum recording power of the second OPC area.

12. A system according to claim 10, further comprising:

means for writing data between the two OPC areas at a power corresponding to the recording power distribution.

13. A system according to claim 10, further comprising:

means for writing two OPC areas with varying recording powers in a second constant angular velocity area of the disk;

means for determining an optimum recording power for each of the two OPC areas of the second constant angular velocity area of the disk; and means for determining a second recording power distribution for the second constant angular velocity zone of the disk by analyzing the optimum recording power which was determined for the two OPC areas of the second constant angular velocity area of the disk.

14. A system according to claim 10, further comprising:

means for writing an OPC area with varying recording power in a second constant angular velocity area of the disk;

means for determining an optimum recording power for the OPC area of the second constant angular velocity area of the disk; and means for determining a second recording power distribution for the second constant angular velocity zone of the disk by analyzing the optimum recording power which was determined for the OPC area of the second constant angular velocity area of the disk and one of the other OPC areas.

15. A system according to claim 14, wherein:

the means for writing the OPC area in the second constant angular velocity area writes the OPC area in an area of the second constant angular velocity zone having a largest radius; and the means for determining a second recording power distribution comprises means for determining a second recording power distribution for the second constant angular velocity zone of the disk by analyzing the optimum recording power which was determined for the OPC area of the second constant angular velocity area of the disk and one of the other OPC areas which has a smaller radius.

16. A system for determining optimum recording power distribution in a modified constant linear velocity (ZCLV) formatted optical disk having multiple data recording areas, comprising:

means for performing multiple test recordings in a plurality of areas having different radii of the optical disk which occur within a single zone of the optical disk which rotates at a constant angular velocity;

means for determining an optimum recording power for each of the plurality of areas; and means for determining a recording power distribution proportional to both linear velocity and a ratio of radii of said plurality of areas for each of the radii of the multiple data recording areas which rotate at different angular velocities by analyzing the optimum recording powers for each of the plurality of areas.

17. A system according to claim 16, wherein the means for performing multiple test recordings comprises:

performing multiple test recordings within the single zone which is used solely for determining the recording power distribution.

18. A system according to claim 16, wherein the means for performing multiple test recordings comprises:

performing multiple test recordings within the single zone without recording any user data in the single zone.

19. A system of determining a recording power distribution in a modified constant linear velocity (ZCLV) formatted optical disk, comprising:

a device which writes two optimum power control (OPC) areas with varying recording powers in a constant angular velocity zone of the disk;

a device configured to determine an optimum recording power for each of the two OPC areas; and a device configured to determine a recording power distribution proportional to both linear velocity and a ratio of the radii of said two optimum power control areas for the constant angular velocity zone of the disk by analyzing the optimum recording power which was determined for the two OPC areas.

20. A system for determining optimum recording power distribution in a modified constant linear velocity (ZCLV) formatted optical disk having multiple data recording areas, comprising:

a device configured to perform multiple test recordings in a plurality of areas having different radii of the optical disk which occur within a single zone of the optical disk which rotates at a constant angular velocity;

a device configured to maintain an optimum recording power for each of the plurality of areas; and a device configured to determine a recording power distribution proportional to both linear velocity and a ratio of radii of said plurality of areas for each of the radii of the multiple data recording areas which rotate at different angular velocities by analyzing the optimum recording powers for each of the plurality of areas.

21. An optical disk, comprising:

a single optimum power control (OPC) area located at an innermost area of said optical disk; and a plurality of data recording areas each having a different constant angular velocity, wherein said single OPC area is utilized for making test recordings to determine recording power distributions across each of said plurality of data recording areas.

* * * * *